United States Patent [19]

Konno

[11] Patent Number: 5,791,190
[45] Date of Patent: Aug. 11, 1998

[54] COUNTER GEAR IN A TRANSMISSION GEAR MECHANISM FOR A RADIO CONTROLLED TOY CAR

[75] Inventor: Tadashi Konno, Tokyo, Japan

[73] Assignee: Nikko Co., Ltd., Tokyo, Japan

[21] Appl. No.: 694,286

[22] Filed: Aug. 8, 1996

[30] Foreign Application Priority Data

Aug. 8, 1995  [JP]  Japan ................... 7-202422

[51] Int. Cl.⁶ ................ A63H 31/00; F16H 55/14
[52] U.S. Cl. ................ 74/411; 74/409; 74/440; 464/61; 464/62
[58] Field of Search ................ 74/409, 411, 440; 464/51, 61, 62, 92, 93

[56] References Cited

U.S. PATENT DOCUMENTS

| | | |
|---|---|---|
| 3,443,449 | 5/1969 | Kotarski ................ 74/411 |
| 4,328,879 | 5/1982 | Tone . | |
| 4,442,516 | 4/1984 | Funabashi ................ 369/43 |
| 4,674,351 | 6/1987 | Byrd . | |
| 5,033,323 | 7/1991 | Janson ................ 74/411 X |
| 5,173,716 | 12/1992 | Tetsuka ................ 464/61 X |
| 5,473,592 | 12/1995 | Choi ................ 74/440 X |

FOREIGN PATENT DOCUMENTS 2 427 683  12/1974  Germany .
144 371    12/1930  Switzerland .

*Primary Examiner*—Charles A. Marmor
*Assistant Examiner*—Troy Grabow
*Attorney, Agent, or Firm*—Young & Thompson

[57] ABSTRACT

A counter gear mechanism having a large gear coaxially engaged to a small gear. The large gear comprises a disk-like portion and a circumferentially extending portion continuously extending on a peripheral portion of the disk-like portion. The circumferentially extending portion has a circumferential outer surface on which first gear teeth are provided. The small gear comprises a disk-like plate and a body being cylindrically shaped to have a circumferential outer surface on which second gear teeth are provided. A tubular member, provided at a center of the disk-like portion, defines a hole and extends along a rotational axis around which the large gear rotates. At least one recessed portion, formed in the disk-like portion, extends in a circumferential direction relative to the rotational axis. At least one projection is fixed to the disk-like plate of the small gear on an opposite side to the side on which the body is provided. The projection inserts into the recessed portion to move along the circumferential direction relative to the rotational axis. First and second spring members are provided within the recessed portion at opposite sides of the projection.

10 Claims, 2 Drawing Sheets

COUNTER GEAR IN A TRANSMISSION GEAR MECHANISM FOR A RADIO CONTROLLED TOY CAR

BACKGROUND OF THE INVENTION

The present invention relates to a counter gear for a radio controlled toy car, and more particularly to a counter gear comprising a large gear and a small gear, both of which are coaxially combined with each other.

The counter gear normally comprises a large gear and a small gear, both of which are coaxially combined with each other. The counter gear is normally used in engagement with other gears such as flat gears to constituting a transmission gear system which transmits a driving power of a driving motor to a rotary shaft connecting wheels. The counter gear is required to be securely engaged with the other gear such as the flat gear for securely transmitting the driving force of the driving motor to the wheels, for which reason rapid change in rotation direction of the transmission gear mechanism applies large loads to the counter gear and the other gears whereby gear teeth are broken.

In order to settle the above problems, it is required to reduce as much as possible large loads applied to the counter gear and the other gears even when the rotation direction of the transmission gear mechanism is rapidly changed.

SUMMARY OF THE INVENTION

Accordingly, it is an object of the present invention to provide a counter gear having a structure capable of a reduction in large loads applied when a rotation direction of a transmission gear mechanism is rapidly changed, wherein the counter gear is used in combination with other gears to constitute the transmission gear mechanism.

It is a further object of the present invention to provide a counter gear comprising a large gear and a small gear, both of which are coaxially combined and capable of a reduction in large loads applied when a rotation direction of a transmission gear mechanism is rapidly changed, wherein the counter gear is used in combination with other gears to constitute the transmission gear mechanism.

The above and other objects, features and advantages of the present invention will be apparent from the following descriptions.

The present invention provides a counter gear mechanism which comprises the following elements. A large gear comprises a disk-like portion and a circumferentially extending portion continuously extending on a peripheral portion of the disk-like portion. The circumferentially extending portion has a larger width than a thickness of the disk-like portion. The circumferentially extending portion has a circumferential outer surface on which first gear teeth are provided. A small gear is coaxially engaged with the large gear. The small gear comprises a disk-like plate and a body being cylindrically shaped to have a circumferential outer surface on which second gear teeth are provided. A tubular member is provided at a center of the disk-like portion. The tubular member defines a hole and extends along a rotation axis around which the large gear rotates. The tubular member projects from the large gear on its one side where the small gear is provided. At least a recessed portion is formed in the disk-like portion. The recessed portion is shaped to draw a part of a circle coaxially encompassing the tubular member. At least a projection is fixed on the disk-like plate of the small gear but on an opposite side to the side on which the body is provided. The projection inserts into the recessed portion to move along a longitudinal direction of the recessed portion. First and second spring members are provided within the recessed portion at opposite sides of the projection so that the first spring member pushes the projection toward the second spring member whilst the second spring member pushes the projection toward the first spring member.

The disk-like portion of the large gear may have first and second recessed portions being positioned at diametrically opposite positions relative to the tubular member. Each of the first and second recessed portions may extend circumferentially 90° relative to the rotational axis so that the small gear is allowed to rotate within a 90° angle relative to the large gear.

The disk-like plate of the small gear may have first and second projections positioned at diametrically opposite sides to have the first and second projections relative to a center of the disk-like plate. The first and second projections may be pillar-shaped to extend in a direction perpendicular to a surface of the disk-like plate.

The disk-like plate and the body may have a common opening with a diameter slightly larger than an outer diameter of the tubular member of the large gear so that the tubular member fits into the common opening when the large and small gears are engaged with each other.

It is possible to provide a disk-like cap on the large gear at its opposite side to the side where the small gear is provided. The disk-like cap may have an opening at its center position. The opening may have a diameter slightly larger than an outer diameter of the tubular member and a diameter of the disk-like cap may be slightly smaller than an inner diameter of the circumferentially extending portion so that the disk-like cap fits between the tubular member and the circumferentially extending portion.

The disk-like plate may have a larger diameter than that of the body. The diameter of the disk-like plate may be slightly smaller than the inner diameter of the circumferentially extending portion so that the disk-like plate fits between the tubular member and the circumferentially extending portion.

The first and second spring members may comprise spiral spring members providing the same spring force.

Alternatively, the first and second spring members may comprise rubber members providing the same spring force.

BRIEF DESCRIPTIONS OF THE DRAWINGS

Preferred embodiments according to the present invention will be described with reference to the accompanying drawings.

PREFERRED EMBODIMENTS

Figure 1:
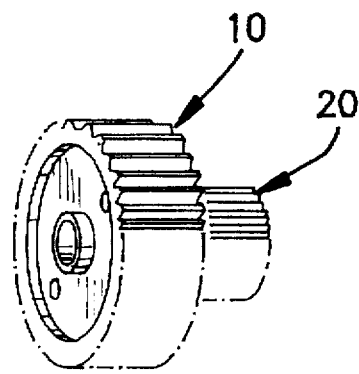
FIG. 1 is a perspective view illustrative of a counter gear in a preferred embodiment according to the present invention.
Figure 2:
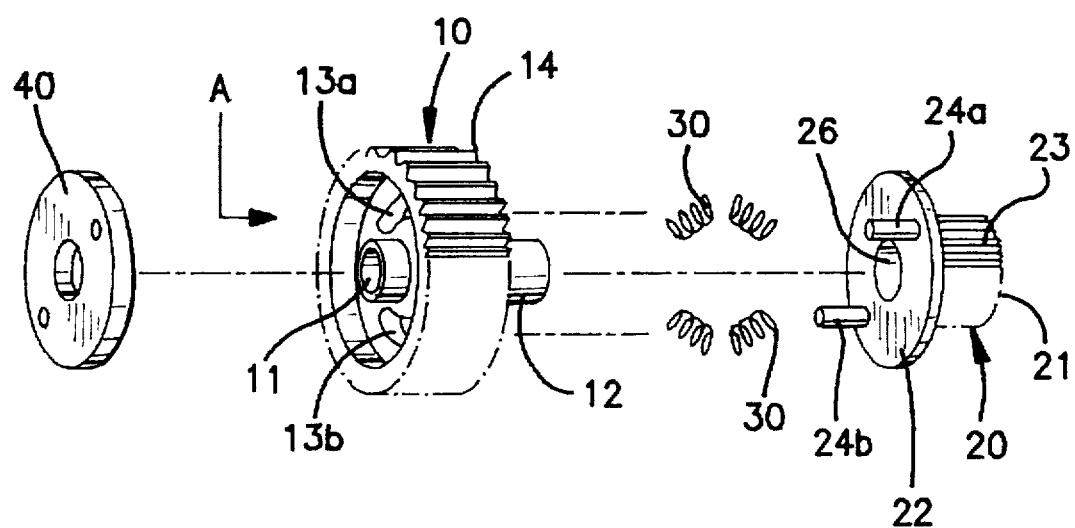
FIG. 2 is an exploded view illustrative of a counter gear in a preferred embodiment according to the present invention, wherein a large gear and a small gear are separately illustrated.
Figure 3:
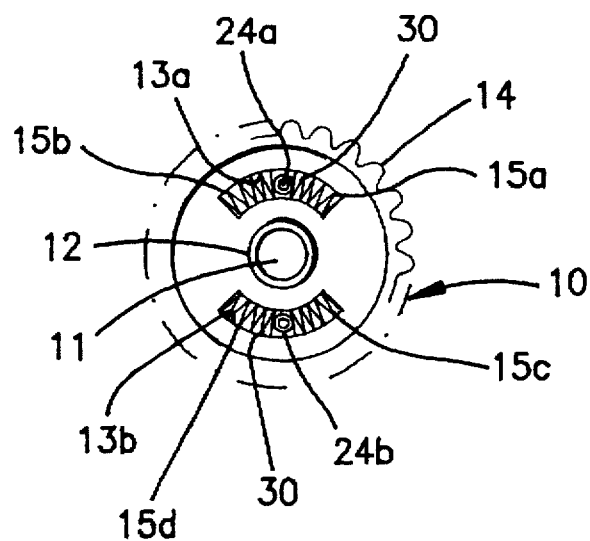
FIG. 3 is a perspective view illustrative of an engaging structure between a large gear and a small gear, both of which constitute a counter gear in a preferred embodiment according to the present invention.

A preferred embodiment according to the present invention will be described. The counter gear comprises a large gear 10 and a small gear 20 which are coaxially combined with each other as illustrated in FIG. 1. As illustrated in FIG. 2, the large gear 10 comprises a disk-like portion and a circumferentially extending portion which continuously extends on a peripheral portion and has a larger width than a thickness of the disk-like portion. The disk-like portion is provided at its center with a tubular member 12 defining a hole 11 into which a shaft not illustrated is inserted. The tubular member 12 extends along a rotational axis, around which the large gear 10 rotates. The tubular member 12 projects from the large gear 10 on its one side where the small gear 20 is provided. The disk-like portion of the large gear 10 has a first recessed portion 13a which extends circumferentially 90° relative to the rotational axis. The disk-like portion of the large gear 10 also has a second recessed portion 13b which is shaped to draw other one quarter of the circle coaxially encompassing the tubular member 12 and diametrically opposite side to the first recessed portion 13a so that the first and second recessed portions 13a and 13b face to each other via the tubular member 12 as illustrated in FIG. 3. The above circumferentially extending portion has a circumferential outer surface on which gear teeth 14 are continuously provided, even in FIGS. 1 through 4, only a part of the gear teeth 14 is illustrated to omit illustrations of the remaining gear teeth.

A disk-like cap 40 is provided to the large gear 10 at the opposite side to the side where the small gear 20 is provided for covering the tubular member 12 and the disk-like portion with the first and second recessed portions 13a and 13b. The disk-like cap 40 has an opening at its center position, wherein the opening has a diameter which is just larger than an outer diameter of the tubular member 12 whilst a diameter of the disk-like cap 40 is slightly smaller than an inner diameter of the circumferentially extending portion so that the disk-like cap 40 fits between the tubular member 12 and the circumferentially extending portion.

The small gear 20 comprises a disk-like plate 22 and a body being cylindrically shaped to have a circumferential outer surface on which gear teeth 23 are continuously provided. The disk-like plate 22 and the body 21 has a common opening 26 which has a diameter slightly larger than the outer diameter of the tubular member 12 of the large gear 10 so that the tubular member 12 fits into the common opening 26 when the large and small gears 10 and 20 are engaged with each other. The disk-like plate 22 has a larger diameter than that of the body 21. The diameter of the disk-like plate 22 is the same as that of the disk-like cap 40 or slightly smaller than the inner diameter of the circumferentially extending portion of the large gear 10 so that the disk-like plate 22 fits into between the tubular member 12 and the circumferentially extending portion. First and second projections 24a and 24b are provided on the disk-like plate 22 of the smaller gear 20, but on an opposite side to the side on which the body 21 is provided. The first and second projections 24a and 24b are pillar-shaped to extend in a direction perpendicular to the surface of the disk-like plate 22. The first and second projections 24a and 24b are positioned at diametrically opposite ends of the common hole 26. The diameter of the first and second pillar-shaped projections 24a and 24b is smaller than a width of the first and second recessed portions 13a and 13b so that the first and second pillar-shaped projections 24a and 24b penetrate through the first and second recessed portions 13a and 13b respectively when the first and second gears 10 and 20 are engaged with each other. When the first and second gears 10 and 20 are engaged with each other, the first and second pillar-shaped projections 24a and 24b are allowed to move along the longitudinal directions of the first and second recessed portions 13a and 13b respectively. As described above, each of the first and second recessed portions 13a and 13b extends to form one quarter of the circle at a right angle, for which reason the small gear 20 is allowed to rotate within a 90° angle relative to the large gear 10.

As illustrated in FIG. 3, first and second spiral spring members 15a and 15b are provided within the first recessed portion 13a at opposite sides of the first pillar-shaped projection 24a so that the first and second spiral spring members 15a and 15b sandwich the first pillar-shaped projection 24a. The first spiral spring member 15a pushes the first pillar-shaped projection 24a toward the second spiral spring member 15b, whilst the second spiral spring member 15b pushes the first pillar-shaped projection 24a toward the first spiral spring member 15a. The first and second spiral spring members 15a and 15b provide the same spring force. Similarly, third and fourth spiral spring members 15c and 15d are provided within the second recessed portion 13b at opposite sides of the second pillar-shaped projection 24b so that the third and fourth spiral spring members 15c and 15d sandwich the second pillar-shaped projection 24b. The third spiral spring member 15c pushes the second pillar-shaped projection 24b toward the fourth spiral spring member 15d, whilst the fourth spiral spring member 15d pushes the second pillar-shaped projection 24b toward the third spiral spring member 15c. The third and fourth spiral spring members 15c and 15d provide the same spring force. Namely, the firsts, second, third and fourth spiral spring members 15a, 15b, 15c and 15d provides the same spring force so that if no rotation force is applied to the first and second gears 10 and 20, then the first and second pillar-shaped projections 24a and 24b are positioned at intermediate positions of the first and second recessed portions 13a and 13b as illustrated in FIG. 3.

Figure 4:
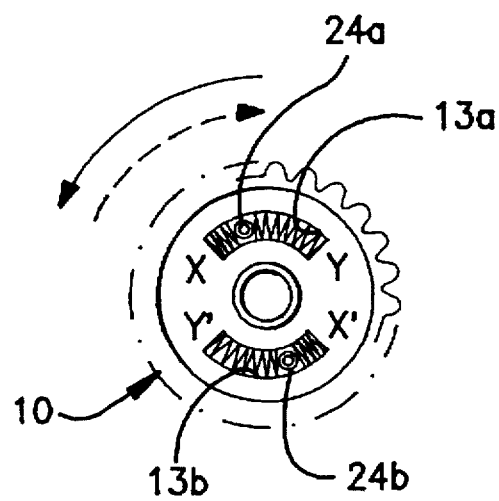
FIG. 4 is a perspective view illustrative of an engaging structure between a large gear and a small gear, both of which constitute a counter gear to explain operations of the counter gear in a preferred embodiment according to the present invention.
Figure 5:
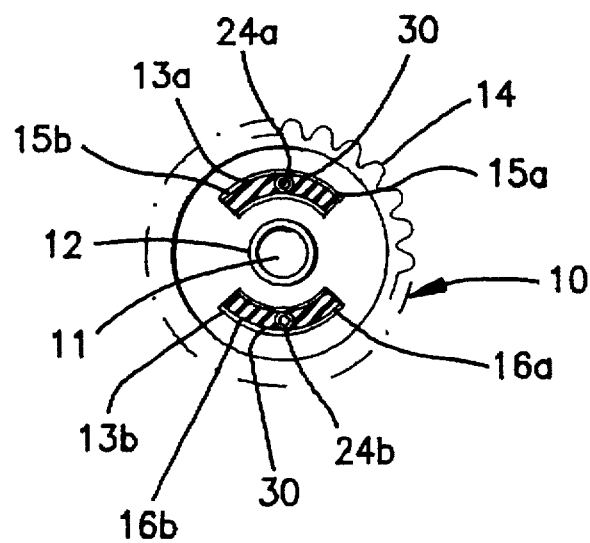
FIG. 5 is a perspective view similar to FIG. 3 with the alternative embodiment where the first and second spring members comprise rubber members.

As illustrated in FIG. 4, if a rotation force in the counter-clockwise direction is applied to the small or large gear 10 or 20, then the first and second pillar-shaped projections 24a and 24b are forced to displace in the counter-clockwise direction so that the first and second pillar-shaped projections 24a and 24b move to approach first ends X and X' of the first and second recessed portions 13a and 13b but comes apart from second ends Y and Y' of the first and second recessed portions 13a and 13b. The movements or displacements of the first and second pillar-shaped projections 24a and 24b are discontinued when the differences in spring force between the first and second spiral spring members 15a and 15b and between the third and fourth spiral spring members 15c and 15d are equivalent to the rotation force applied to the small or large gear 10 or 20. If the application of the rotation force in the counter-clockwise direction is discontinued, the first and second pillar-shaped projections 24a and 24b return back to the intermediate positions of the first and second recessed portions 13a and 13b by the differences in spring force between the first and second spiral spring members 15a and 15b and between the third and fourth spiral spring members 15c and 15d.

If, however, a rotation force in the clockwise direction is applied to the small or large gear 10 or 20, then the first and second pillar-shaped projections 24a and 24b are forced to displace in the clockwise direction so that the first and second pillar-shaped projections 24a and 24b move to approach the second ends Y and Y' of the first and second recessed portions 13a and 13b but comes apart from the first ends X and X' of the first and second recessed portions 13a and 13b. The movements or displacements of the first and second pillar-shaped projections 24a and 24b are discontinued when the differences in spring force between the first and second spiral spring members 15a and 15b and between the third and fourth spiral spring members 15c and 15d are equivalent to the rotation force applied to the small or large gear 10 or 20. And if the application of the rotation force in the clockwise direction is discontinued, the first and second pillar-shaped projections 24a and 24b return back to the intermediate positions of the first and second recessed portions 13a and 13b by the differences in spring force between the first and second spiral spring members 15a and 15b and between the third and fourth spiral spring members 15c and 15d.

For facilitation of the concrete understanding for the operations of the counter gear mechanism, the following descriptions will be made by assuming that the counter gear is used so that the small gear 20 is connected to a driving motor whilst the large gear 10 is engaged with other gear which is directly or indirectly connected to a rotary shaft which connects wheels.

If a rotation force in the counter-clockwise direction is rapidly applied by a driving motor to the small gear 20, then the first and second pillar-shaped projections 24a and 24b are forced to displace in the counter-clockwise direction so that the first and second pillar-shaped projections 24a and 24b move to approach the first ends X and X' of the first and second recessed portions 13a and 13b respectively but come apart from the second ends Y and Y' of the first and second recessed portions 13a and 13b respectively. The movements or displacements of the first and second pillar-shaped projections 24a and 24b are continued until the differences in spring force between the first and second spiral spring members 15a and 15b and between the third and fourth spiral spring members 15c and 15d are equivalent to the rotation force applied to the small gear 20 by the driving motor. Even the rapid application of the rotation force to the small gear 20 by the driving motor appears, the rotation force rapidly applied is absorbed during the movements or displacements of the first and second pillar-shaped projections 24a and 24b in the counter-clockwise direction before the rotation force of the driving motor is securely transmitted via the small gear 20 to the large gear 10 wherein the first and second pillar-shaped projections 24a and 24b are positioned in the vicinity of the first ends X and X' of the first and second recessed portions 13a and 13b respectively. Namely, the shock due to the rapid application of the rotation force of the driving motor is absorbed by the first, second, third and fourth spiral spring members 15a, 15b, 15c and 15d during the movements or displacements of the first and second pillar-shaped projections 24a and 24b in the counter-clockwise direction within the first and second recessed portions 13a and 13b. This mechanism renders the gear system free from any shock or damage due to the rapid application of the driving force to the small gear 20 to thereby prevent the gear teeth from being broken. If the application of the rotation force in the counter-clockwise direction is discontinued, the first and second pillar-shaped projections 24a and 24b return back to the original intermediate positions of the first and second recessed portions 13a and 13b by the differences in spring force between the first and second spiral spring members 15a and 15b and between the third and fourth spiral spring members 15c and 15d.

If, however, a rotation force in the clockwise direction is rapidly applied by a driving motor to the small gear 20, then the first and second pillar-shaped projections 24a and 24b are forced to displace in the clockwise direction so that the first and second pillar-shaped projections 24a and 24b move to approach the second ends Y and Y' of the first and second recessed portions 13a and 13b respectively but come apart from the first ends X and X' of the first and second recessed portions 13a and 13b respectively. The movements or displacements of the first and second pillar-shaped projections 24a and 24b are continued until the differences in spring force between the first and second spiral spring members 15a and 15b and between the third and fourth spiral spring members 15c and 15d are equivalent to the rotation force applied to the small gear 20 by the driving motor. Even the rapid application of the rotation force to the small gear 20 by the driving motor appears, the rotation force rapidly applied is absorbed during the movements or displacements of the first and second pillar-shaped projections 24a and 24b in the clockwise direction before the rotation force of the driving motor is securely transmitted via the small gear 20 to the large gear 10 wherein the first and second pillar-shaped projections 24a and 24b are positioned in the vicinity of the second ends Y and Y' of the first and second recessed portions 13a and 13b respectively. Namely, the shock due to the rapid application of the rotation force of the driving motor is absorbed by the first, second, third and fourth spiral spring members 15a, 15b, 15c and 15d during the movements or displacements of the first and second pillar-shaped projections 24a and 24b in the clockwise direction within the first and second recessed portions 13a and 13b. This mechanism renders the gear system free from any shock or damage due to the rapid application of the driving force to the small gear 20 to thereby prevent the gear teeth from being broken. If the application of the rotation force in the clockwise direction is discontinued, the first and second pillar-shaped projections 24a and 24b return back to the original intermediate positions of the first and second recessed portions 13a and 13b by the differences in spring force between the first and second spiral spring members 15a and 15b and between the third and fourth spiral spring members 15c and 15d.

In place of the above first, second, third and fourth spiral spring members 15a, 15b, 15c and 15d, any other spring members such as elastic members, for example, rubber members may be used.

Although the above descriptions about the operation of the counter gear mechanism has now been made by assuming that the small gear 20 is connected to the driving motor and the large gear 10 is connected to the other gear such as flat gear, the above counter gear mechanism would show the same operations as described above if the large gear 10 is connected to the driving motor and the small gear 20 is connected to the other gear such as flat gear.

Whereas any further modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A counter gear mechanism comprising:
   a large gear comprising a disk-like portion and a circumferentially extending portion continuously extending on a periphery of said disk-like portion, said circumferentially extending portion having a larger width than a thickness of said disk-like portion, said circumferentially extending portion having a circumferential outer surface on which first gear teeth are provided;

a small gear coaxially engaged to said large gear, said small gear comprising a disk-like plate and a cylindrically shaped body having a circumferential outer surface on which second gear teeth are provided;

a tubular member at a center of said disk-like portion, said tubular member defining a hole and extending along a rotational axis around which said large gear rotates, said tubular member projecting from said large gear on a side which said small gear is provided;

a recessed portion in said disk-like portion extending in a circumferential direction relative to said rotational axis;

a projection fixed to said disk-like plate of said small gear on an opposite side to the side on which said body is provided, said projection engaging said recessed portion so as to move along said circumferential direction relative to said rotational axis; and first and second spring members within said recessed portion at opposite sides of said projection so that said first and second spring member urges said projection toward each other.

2. The counter gear mechanism as claimed in claim 1, wherein said disk-like portion of said large gear has first and second recessed portions positioned at diametrically opposite positions relative to said tubular member.

3. The counter gear mechanism as claimed in claim 2, wherein each of said first and second recessed portions extends circumferentially 90° relative to said rotational axis so that said small gear is allowed to rotate within a 90° angle relative to the large gear.

4. The counter gear mechanism as claimed in claim 1, wherein said disk-like plate of said small gear has first and second projections positioned at diametrically opposite sides of a center of said disk-like plate.

5. The counter gear mechanism as claimed in claim 4, wherein said first and second projections are pillar-shaped to extend in a direction perpendicular to a surface of said disk-like plate.

6. The counter gear mechanism as claimed in claim 1, wherein said disk-like plate and said body have a common opening with a diameter slightly larger than an outer diameter of said tubular member of said large gear so that said tubular member fits into said common opening when said large and small gears are engaged with each other.

7. The counter gear mechanism as claimed in claim 1, further comprising a disk-like cap provided on said large gear at its opposite side to the side where said small gear is provided, said disk-like cap having an opening at its center, and said opening having a diameter slightly larger than an outer diameter of said tubular member whilst a diameter of said disk-like cap being slightly smaller than an inner diameter of said circumferentially extending portion so that said disk-like cap fits between said tubular member and said circumferentially extending portion.

8. The counter gear mechanism as claimed in claim 1, wherein said disk-like plate has a larger diameter than that of said body, said diameter of said disk-like plate is slightly smaller than said inner diameter of the circumferentially extending portion so that said disk-like plate fits into between said tubular member and said circumferentially extending portion.

9. The counter gear mechanism as claimed in claim 1, wherein said first and second spring members comprise spiral spring members providing equal spring force.

10. The counter gear mechanism as claimed in claim 1, wherein said first and second spring members comprise rubber members providing the equal spring force.

* * * * *